Patented Jan. 8, 1946

2,392,555

UNITED STATES PATENT OFFICE 2,392,555

PROCESS FOR THE SYNTHESIS OF MERCAPTANS

Walter A. Schulze, Bartlesville, Okla., assignor to Phillips Petroleum Company, a corporation of Delaware No Drawing. Application July 3, 1943, Serial No. 493,466

9 Claims. (Cl. 260—609)

This invention relates to the manufacture of alkyl mercaptans. In a more specific embodiment, the invention relates to the synthesis of high-boiling mercaptans having properties specifically required in modifiers of synthetic rubbers. Still more specifically, this invention relates to the production of alkyl mercaptans of uniform modifying activity and having 8 to 12 or more carbon atoms per molecule, through the catalytic addition of hydrogen sulfide to a special catalytically pretreated olefinic feed stock.

The synthesis of aliphatic mercaptans through the direct addition of hydrogen sulfide to an olefinic linkage, with or without the presence of catalysts, is a well established reaction. However, the application of this synthesis to produce the higher aliphatic homologs presents special problems relative to olefinic feed stocks, reaction conditions, and product purification peculiar to the production of mercaptans having chemical properties conforming with the exacting requirements of synthetic rubber modifiers. Straight thermal methods have been applied to the olefin-hydrogen sulfide reaction to produce mixtures of mercaptans and thioethers. The temperature conditions are necessarily severe being on the order of 500° F. and higher, hence the application of a straight thermal process to the synthesis of high-boiling mercaptans is not advantageous because of the instability of the products at such elevated temperatures. Catalytic methods have been proposed wherein metallic sulfides, fuller's earth, silica gel, charcoal and the like have been mentioned as catalysts. The products obtained in such catalytic reactions normally possess fewer carbon atoms than the olefinic intermediates, thus indicating degradation reactions which may be undesirable in the production of the high-boiling mercaptans. In the synthesis of the low-molecular weight alkyl mercaptans including the $C_2$ to $C_8$ homologs it is ordinarily possible to prepare reasonably pure products by using a relatively pure olefin intermediate in the synthesis, mild reaction conditions, and thorough fractionation of the product. While theoretically possible, it is economically impractical to prepare a pure olefin feed from the olefinic mixtures comprising a great number of isomers in the higher boiling range, such as $C_{12}$ to $C_{14}$. Furthermore because of the very low volatility of the high-boiling mercaptans, fractionation even under high vacuum is not feasible as a means of segregating relatively pure compounds as products.

One object of the present invention is to provide an improved process for the manufacture of high-boiling mercaptans of uniform characteristics. Another object is to effect the catalytic addition of hydrogen sulfide to certain types of olefinic hydrocarbons to produce mercaptans useful as synthetic rubber modifiers. Another object of this invention is to provide an isomerizing pretreatment of mixed olefinic isomers to yield a uniform feed stock of such characteristics that an exceptionally uniform and desirable product is realized in a subsequent mercaptan-forming reaction. Still another object of this invention is the manufacture of high-molecular weight alkyl mercaptans from mixed olefin polymers by means of a sequence of operations leading to substantially exclusive formation of tertiary compounds of such molecular structure as to be unusually resistant to oxidation under conditions prevailing in the manufacture of synthetic rubber, as in the co-polymerization of butadiene and styrene in aqueous emulsion. Still further objects and advantages of this invention will become apparent, to one skilled in the art, from the accompanying disclosure and discussion.

I have now found that treatment of olefin polymers or other complex olefinic material under isomerizing conditions results in an improved feed for mercaptan synthesis where uniformity in chemical reactivity of the product is important. Under the relatively mild conditions employed in the mercaptan synthesis further structural changes in the hydrocarbon residue do not ordinarily occur, hence the nature of the final product is largely determined by the characteristics of the olefinic feed.

For the manufacture of high-boiling aliphatic mercaptans, such as those having from 11 to 14 carbon atoms per molecule, heavy polymer obtained as a by-product of aviation gasoline co-dimer production affords adequate commercial source of olefinic feed stock for the reaction. However, the different isomeric olefins theoretically possible in such high boiling materials are computed in the thousands, and even relatively narrow boiling fractions are ordinarily complex mixtures as to both molecular weight and structure. The utilization of such complex olefinic mixtures for the synthesis of mercaptans or other sulfur derivatives thus may result in the production of mixtures whose constituent compounds differ in structure and in chemical characteristics. Furthermore, the composition of the olefin feed mixtures and hence of the mercaptan products may in some cases vary rather widely within the limits corresponding to normal operation and control of catalytic processes.

Relatively high-boiling alkyl mercaptans, such as those having from 11 to 14 carbon atoms per molecule, have been found exceedingly useful as modifiers in the manufacture of synthetic rubbers, especially those which may be termed Buna-type, that is, copolymers of conjugated diolefins with vinyl compounds such as styrene, acrylonitrile, esters of acrylic acid, etc., particularly when polymerization is carried out in aqueous emulsion. It is now known that certain desirable characteristics of the mercaptans are associated with particular molecular structures which influence such properties as rate of oxidation, relative efficiency as modifiers in polymerization, and the like. In many instances, mercaptans having the functional group attached to a tertiary carbon system are preferred over compounds having primary or secondary linkages. Similarly, compact, highly branched carbon skeleton structures often produce improved characteristics when compared with straight or slightly branched carbon chains. I have discovered that isomerization of olefin polymer or other complex olefin feed stocks for the synthesis of mercaptans may be utilized to accomplish a shifting of the olefinic bond toward the center of the molecule and at the same time to promote a desirable rearrangement of the carbon skeleton to a more branched compact and stable arrangement. When the thus isomerized olefin mixtures are subsequently converted into mercaptans by treatment under suitable conditions with hydrogen sulfide, preferably in the presence of an active catalyst, the proportions of product compounds having highly branched chain structure and/or tertiary mercaptan linkages are increased and may be satisfactorily maintained.

The advantages of the isomerization treatment of the olefin feed are further reflected in a consistently uniform product and higher yields per pass in the synthesis stage of the process. The isomerized olefin feed, although still a mixture, has had its isomers greatly reduced in number; and, even more important, has had the isomers consolidated in type. With this treated olefinic feed the production of predominantly tertiary-type mercaptans is assured and since the carbon skeletons have been rendered more branched and compact the chemical activity of the product isomers, especially with respect to oxidation, will tend to approach a common level. Since isomerization results in the more thermally stable olefins, reaction conditions in the synthesis stage may, if desired, be more severe than with untreated feed with consequent greater depth of conversion per pass with a minimum formation of undesirable by-products.

The process of the present invention comprises, in preferred embodiment, a two-stage operation in which a selected fraction of olefins in the desired boiling range is isomerized in a first catalytic stage and the olefin-hydrogen sulfide reaction is carried out in a second stage. The isomerization treatment is preferably effected over catalysts such as bauxite, alumina, magnesia, thoria, phosphoric acid and the like. The treatment may be carried out in either liquid or vapor phase. In liquid phase operation, sufficient pressure is applied to avoid vaporization of the feed at conversion temperatures, and the temperature and contact time are selected in accordance with the activity of the catalyst and the desired extent of conversion. In some instances it may be desirable to treat the olefin feed in the vapor state by suitable adjustment of pressure and temperature conditions.

The effluent from the isomerization treatment, preferably after stabilization to remove any light olefins, is ordinarily charged directly to the second stage mercaptan reactor. In some instances it may be advantageous to fractionate the stabilized effluent to prepare feed stocks of relatively restricted boiling range in order to enhance the benefits of the isomerization treatment. A desirable olefinic feed to the mercaptan synthesis step has a boiling range within the approximate limits of 335–400° F.

The mercaptan synthesis is advantageously effected in the presence of a catalyst. Any suitable catalyst may be used, but ordinarily solid adsorbent catalysts such as natural or activated clays, or preferably synthetic gel-type silica-metal oxide compositions, are utilized. Synthetic gel-type catalysts preferably comprise a major portion of silica and a minor portion (usually about 1 to about 5 per cent by weight) of an oxide of a metal belonging to one of groups IIIB and IVA of the periodic system, including boron, aluminum, gallium, indium, and thallium in group IIIB and titanium, zirconium, hafnium, and thorium in group IVA. The use of such synthetic catalysts to react olefins with hydrogen sulfide to form mercaptans is disclosed in my copending application Serial No. 493,463, filed July 3, 1943.

The isomerized olefin feed is charged to the second stage reaction zone along with controlled proportions of hydrogen sulfide. It is ordinarily desirable to employ a molal excess of hydrogen sulfide, and inert diluents may or may not be added. The feed to the mercaptan reaction is passed continuously through a stationary bed of granular catalyst, or contacted with the solid catalyst in any other desired manner, and the reaction effluent may be continuously fractionated or otherwise treated to separate hydrogen sulfide and unreacted olefin from the product.

In a specific and preferred embodiment of the invention, an olefin feed such as a $C_{11}$—$C_{14}$ fraction which may be derived from the catalytic co-polymerization of $C_3$ and $C_4$ olefins, or from the polymerization of one or more olefins of from two to six carbon atoms per molecule, is selected as the feed for the isomerization stage. The crude olefinic stock is charged to an isomerization catalyst under pressures ranging from about atmospheric to about 500 pounds per square inch gage at a flow-rate of about 0.1 to about 5 liquid volumes per volume of catalyst per hour. Temperatures within the catalyst case will depend on the type and activity of the catalyst as well as the refractory nature of the feed and may range from about 200° F. to about 800° F. The effluent hydrocarbon, after suitable stabilization and/or fractionation, is charged to the second-stage reactor in admixture with hydrogen sulfide. The catalyst for the mercaptan synthesis may comprise a silica-metal oxide gel such as synthetic silica-alumina. The second-stage reaction temperature is maintained between about 100° F. and 300° F. or higher at flow-rates between about 1 and about 10 liquid volumes per volume of catalyst per hour. Under the conditions of this invention where specially treated high-boiling olefins are employed, the principal reaction occurring is the addition of $H_2S$ to the olefinic linkages so that the combined sulfur appears as mercaptans substantially corresponding in carbon content to the olefinic feed. The final effluent is treated by conventional means for recovery of hydrogen sulfide, and the unreacted hydrocarbon is distilled from the product under diminished pressure. Other suitable treatment, such as solvent extraction, chemical absorption, etc., may be applied to the effluent to recover the mercaptan and/or separate hydrogen sulfide from unreacted olefins. The $H_2S$ and the unconverted hydrocarbons are ordinarily recycled.

Solid contact catalysts are preferred for each of the two stages of the process, and are selected in accordance with their activity toward the respective isomerization and mercaptan-forming reactions. In the first or olefin-isomerization stage, activated alumina is ordinarily the preferred catalyst, although activated brucite, magnesia, thoria, natural clays, and carriers impregnated with suitable mineral acids and/or acid salts may be employed. The hydrogen sulfide-olefin reaction is adequately catalyzed by solid catalysts comprising metal oxides of which certain activated gel-type silica-alumina compositions are preferred. Other contact catalysts, however, may be employed, as well as liquid catalysts which are capable of promoting the desired reactions.

Temperatures in the olefin isomerization step of this invention are usually, maintained within the range of about 200 to about 800° F. depending on the catalyst employed. With activated bauxite or alumina, effective isomerizing activity may be realized in the range of about 400 to about 700° F. With substantially anhydrous brucite and similar magnesia compositions, temperatures of about 200 to about 600° F. may be employed.

Temperatures applicable to the mercaptan synthesis where silica-alumina-type gel catalysts are employed include the range of about 100° F. to about 400° F. with a somewhat narrower range of about 200 to 300° F. preferred. Since the condensation reaction is usually promoted by superatmospheric pressures, operating pressures may be in the range of about 500 to about 1500 pounds gage.

The following exemplary operation will serve to further illustrate the process and one specific method of application.

An olefinic polymer produced by the catalytic polymerization of $C_3$—$C_5$ olefins is fractionated to remove material in the aviation gasoline boiling range and to segregate a high-boiling stock containing principally $C_{11}$ to $C_{14}$ olefins. The stock thus segregated is treated over activated alumina at a temperature of 700° F., a flow rate of one liquid volume of charge per volume of catalyst per hour, and under pressure sufficient to maintain the hydrocarbon mixture in liquid phase in the catalyst bed.

The effluent from the isomerization stage is stripped to remove normally gaseous olefins formed in the high temperature treatment, and these light olefins are returned to the polymerization unit. The liquid products are then fractionated to segregate an isomerized olefin mixture with a boiling range of 340 to 380° F.

The isomerized olefin mixture is admixed with $H_2S$ in a mol ratio of 1:1.5 and passed over a catalyst prepared by activating silica gel with alumina. The treating conditions are 260° F., 1000 pounds gage pressure, and a flow rate of 3 liquid volumes of charge per volume of catalyst per hour. The effluent is stripped of unreacted $H_2S$ and other relatively low boiling products at reduced pressure, and the mercaptan products are separated from unreacted olefin by vacuum fractionation.

The product thus obtained is a mixture of $C_{12}$ and higher molecular weight mercaptans boiling in the range of about 250 to 310° F. at 40 mm. Hg absolute pressure. The mercaptans are identified as substantially completely tertiary mercaptans. The product is stable to air oxidation at normal and moderately elevated temperatures and is only very slowly affected by oxidizing agents such as hydrogen peroxide, indicating highly branched chain structure and attachment of the functional group to a tertiary carbon system.

Both the proportions of tertiary compounds and the stability as evidenced by oxidation treatments are superior to mercaptan products prepared from olefin feed stocks which have similar physical characteristics but which are not subjected to the preliminary isomerization treatment.

It is to be understood that the invention should not be unduly limited by the above example, inasmuch as other feed stocks and reaction conditions may be utilized as disclosed herein. While I have referred primarily to the use of olefinic polymers, almost any other practicable source of olefins will also comprise a mixture of various isomers, which may advantageously be subjected to treatment by the process of this invention to produce the preferred mercaptans. As will be readily appreciated by one skilled in the art various modifications of my invention may be practiced, in the light of the present disclosure and teachings, without departing from the scope or spirit of the claims.

I claim:

1. A process for the production of high-boiling mercaptans predominantly comprising mercaptans having a branched carbon skeleton and having the mercaptan group attached to a tertiary carbon atom, which comprises subjecting a mixed olefinic material comprising essentially olefins having at least eight carbon atoms per molecule to isomerization to effect an increase in the content thereof of olefins having a branched carbon skeleton and having olefinic linkages attached to tertiary carbon atoms, and reacting thus-isomerized olefinic material with hydrogen sulfide to produce said mercaptans.

2. In the manufacture of high-boiling mercaptans useful as synthetic rubber modifiers by the reaction of hydrogen sulfide with mixed olefinic polymers, the improvement which comprises subjecting such mixed olefinic polymers, prior to said reaction, to isomerization to increase the branched structure and tertiary olefinic linkages thereof.

3. A process according to claim 1 in which said isomerization is effected in the presence of a solid contact isomerization catalyst at temperatures in the range of about 200 to about 800° F.

4. A process according to claim 1 in which said isomerization is effected in the presence of an activated alumina catalyst at temperatures in the range of about 400 to about 700° F.

5. A process according to claim 1 in which said isomerized olefinic material is reacted with hydrogen sulfide in the presence of a solid contact catalyst effective in promoting the formation of mercaptans.

6. A process according to claim 1 in which said isomerized olefinic material is reacted with hydrogen sulfide in the presence of a synthetic gel-type catalyst comprising a major portion of silica and a minor portion of an oxide of a metal selected from groups IIIB and IVA of the periodic system.

7. A process according to claim 1 in which said isomerized olefinic material is reacted with hydrogen sulfide in the presence of a synthetic silica-alumina catalyst at temperatures in the range of about 100 to about 400° F.

8. A process for the synthesis of high-boiling alkyl mercaptans which comprises subjecting an olefinic polymer, comprising a plurality of isomeric olefins having at least eight carbon atoms per molecule and obtained by the catalytic polymerization of $C_2$ to $C_6$ olefins, to catalytic isomerization to effect a net shift of olefinic bonds to more central location and to effect a net increase in the branching of the carbon skeleton, separating from the resulting material olefins having at least eight carbon atoms per molecule, admixing therewith hydrogen sulfide in molal excess and subjecting the resultant mixture to the action of a suitable catalyst and under such reaction conditions as to form mercaptans while avoiding any substantial structural changes in the hydrocarbon residue, and recovering as products of the process mercaptans having at least eight carbon atoms per molecule.

9. A process according to claim 1 in which said mixed olefinic material is a polymer fraction having not less than 11 and not more than 14 carbon atoms per molecule, and in which an isomerized olefinic material boiling not lower than about 335° F. and not higher than about 400° F. is reacted with hydrogen sulfide.

WALTER A. SCHULZE.